(12) United States Patent
Dam et al.

(10) Patent No.: US 11,975,275 B2
(45) Date of Patent: May 7, 2024

(54) METHOD AND APPARATUS FOR FILTERING FLUID IN NUCLEAR POWER GENERATION

(71) Applicant: CANDU ENERGY INC., Mississauga (CA)

(72) Inventors: Richard Dam, Hamilton (CA); Francois Cussac, Oakville (CA); Jian Xu, Oakville (CA); Wei Yan Wang, Waterloo (CA); Wing Fai Lam, Mississauga (CA)

(73) Assignee: CANDU ENERGY INC., Mississauga (CA)

( * ) Notice: Subject to any disclaimer, the term of this patent is extended or adjusted under 35 U.S.C. 154(b) by 0 days.

(21) Appl. No.: 18/302,121

(22) Filed: Apr. 18, 2023

(65) Prior Publication Data

US 2023/0271114 A1 Aug. 31, 2023

Related U.S. Application Data

(62) Division of application No. 16/754,113, filed as application No. PCT/CA2018/051259 on Oct. 5, 2018, now abandoned.

(Continued)

(51) Int. Cl.
*B01D 29/07* (2006.01)
*B01D 29/56* (2006.01)
(Continued)

(52) U.S. Cl.
CPC ............ *B01D 29/07* (2013.01); *B01D 29/56* (2013.01); *G21C 19/307* (2013.01); *G21D 1/02* (2013.01); *B01D 2201/60* (2013.01); *G21D 1/04* (2013.01)

(58) Field of Classification Search
None
See application file for complete search history.

(56) References Cited

U.S. PATENT DOCUMENTS

| | | | | |
|---|---|---|---|---|
| 445,223 | A | * | 1/1891 | Knight ................. B01D 37/025 55/501 |
| 2,058,669 | A | * | 10/1936 | Dollinger ............... B01D 46/10 55/499 |

(Continued)

FOREIGN PATENT DOCUMENTS

| CN | 105221312 | | 1/2016 |
|---|---|---|---|
| JP | 2015212691 | A | 11/2015 |

(Continued)

OTHER PUBLICATIONS

An office action issued in the corresponding Taiwan Patent Application No. 107135289, dated Mar. 20, 2023, issued by the Taiwanese Patent Office.

(Continued)

*Primary Examiner* — Robert J Popovics
(74) *Attorney, Agent, or Firm* — NORTON ROSE FULBRIGHT CANADA LLP (57) ABSTRACT

A filtering apparatus for a fluid intake of a nuclear power generation facility comprise primary and secondary frames. The primary frame defines an enclosed volume having least one inlet opening, and at least one outlet opening in fluid communication with the fluid intake. A primary filter is supported on the primary frame and covers the inlet opening such that fluid passes into the enclosed volume through the primary filter. The secondary frame is located within the volume enclosed by the primary frame. A secondary filter is supported on the secondary frame and defines an enclosed flow passage in communication with the outlet opening, (Continued)

US 11,975,275 B2

Page 2 such that fluid passes into the at least one outlet opening through the secondary filter and the enclosed flow passage.

18 Claims, 7 Drawing Sheets

Related U.S. Application Data

(60) Provisional application No. 62/569,324, filed on Oct. 6, 2017.

(51) Int. Cl.
  *G21C 19/307* (2006.01)
  *G21D 1/02* (2006.01)
  *G21D 1/04* (2006.01)

(56) References Cited

U.S. PATENT DOCUMENTS

| | | | | | |
|---|---|---|---|---|---|
| 2,079,297 | A | * | 5/1937 | Manning | B01D 46/10 55/491 |
| 2,130,107 | A | * | 9/1938 | Somers | B01D 46/0097 55/502 |
| 2,130,806 | A | * | 9/1938 | Link | D06F 58/22 55/484 |
| 2,393,419 | A | * | 1/1946 | Schaaf | B01D 46/10 52/658 |
| 2,405,293 | A | * | 8/1946 | Dahlman | B01D 46/10 403/345 |
| 2,405,716 | A | * | 8/1946 | Schaaf | B01D 29/21 55/529 |
| 2,423,741 | A | * | 7/1947 | Vokes | B01D 46/523 55/491 |
| 2,502,560 | A | * | 4/1950 | Dahlman | B03C 3/155 55/483 |
| 2,639,003 | A | * | 5/1953 | Russell | B01D 46/10 29/446 |
| 2,658,583 | A | * | 11/1953 | Fitzgerald | F02M 35/164 52/579 |
| 2,723,731 | A | * | 11/1955 | Schaaf | B01D 29/012 52/658 |
| 2,739,667 | A | * | 3/1956 | Palmore | B01D 35/00 55/529 |
| 2,758,671 | A | * | 8/1956 | Silverman | B01D 46/04 55/517 |
| 2,869,694 | A | * | 1/1959 | Breckheimer | F16B 5/06 403/231 |
| 3,099,547 | A | * | 7/1963 | Hagendoorn | B01D 46/02 55/497 |
| 3,183,286 | A | * | 5/1965 | Harms | B01D 46/0001 55/497 |
| 3,186,149 | A | * | 6/1965 | Ayers | B01D 46/12 55/517 |
| 3,234,717 | A | * | 2/1966 | Korn | B01D 46/523 55/501 |
| 3,246,456 | A | * | 4/1966 | Sharp | F24F 13/28 55/483 |
| 3,271,932 | A | * | 9/1966 | Newell | B03C 3/40 55/491 |
| 3,280,984 | A | * | 10/1966 | Sexton | B01D 46/10 210/485 |
| 3,330,101 | A | * | 7/1967 | Murphy, Jr. | B01D 46/2407 55/529 |
| 3,389,031 | A | * | 6/1968 | Rosaen | B01D 29/666 210/485 |
| 3,402,531 | A | * | 9/1968 | Farr | B61C 17/04 55/514 |
| 3,438,180 | A | * | 4/1969 | Klouda | B03C 3/155 55/318 |
| 3,494,113 | A | * | 2/1970 | Kinney | B01D 46/0005 55/497 |
| 3,513,643 | A | * | 5/1970 | Tarala | B01D 46/0036 55/497 |
| 3,581,476 | A | * | 6/1971 | Rivers | B01D 46/12 55/504 |
| 3,626,668 | A | * | 12/1971 | Cardiff | B03C 3/155 55/318 |
| 3,675,394 | A | * | 7/1972 | Sterrett | B01D 46/30 55/518 |
| 3,774,377 | A | * | 11/1973 | Bishop | B01D 46/10 55/504 |
| 3,778,985 | A | * | 12/1973 | Daigle | B01D 46/0016 55/497 |
| 3,789,589 | A | * | 2/1974 | Delany | B01D 46/0006 55/502 |
| 3,812,370 | A | * | 5/1974 | LaViolette | F24F 13/28 55/483 |
| 3,853,519 | A | * | 12/1974 | York, Jr. | B01D 46/0006 55/513 |
| 3,912,472 | A | * | 10/1975 | Marble | B01D 53/0407 55/484 |
| 4,096,032 | A | * | 6/1978 | Mayers | G21C 17/00 976/DIG. 207 |
| 4,129,429 | A | * | 12/1978 | Humbert, Jr. | B01D 46/121 210/493.1 |
| 4,177,050 | A | * | 12/1979 | Culbert | B01D 46/523 55/499 |
| 4,225,328 | A | * | 9/1980 | Stiehl | B01D 46/521 55/497 |
| 4,233,044 | A | * | 11/1980 | Allan | B01D 46/522 55/483 |
| 4,290,788 | A | * | 9/1981 | Pittman | B03C 3/66 96/86 |
| 4,334,899 | A | * | 6/1982 | McConnell | B01D 50/20 55/DIG. 35 |
| 4,376,091 | A | * | 3/1983 | Netkowicz | G21C 9/012 976/DIG. 142 |
| 4,449,993 | A | * | 5/1984 | Bergeron | B01D 46/02 55/497 |
| 4,509,958 | A | * | 4/1985 | Masuda | B03C 3/66 96/60 |
| 4,547,950 | A | * | 10/1985 | Thompson | B01D 46/10 29/445 |
| 4,549,887 | A | * | 10/1985 | Joannou | B03C 3/14 96/58 |
| 4,584,005 | A | * | 4/1986 | Allan | B01D 46/10 160/381 |
| 4,600,419 | A | * | 7/1986 | Mattison | B01D 46/521 55/508 |
| 4,617,122 | A | * | 10/1986 | Kruse | B01D 46/10 210/493.3 |
| 4,639,261 | A | * | 1/1987 | Pittman | F24F 8/108 55/483 |
| 4,685,944 | A | * | 8/1987 | Allan | B01D 46/523 55/497 |
| 4,778,496 | A | * | 10/1988 | Conrad | F24F 1/04 55/472 |
| 4,853,005 | A | * | 8/1989 | Jaisinghani | B03C 3/155 96/60 |
| 4,885,015 | A | * | 12/1989 | Goulet | B01D 46/10 428/184 |
| 4,963,171 | A | * | 10/1990 | Osendorf | B01D 46/10 55/497 |
| 5,015,377 | A | * | 5/1991 | Silvera | B31D 3/0215 210/488 |
| 5,035,799 | A | * | 7/1991 | Rosberg | B01D 61/14 210/411 |
| 5,080,699 | A | * | 1/1992 | Ho | F24F 8/108 55/495 |
| 5,108,470 | A | * | 4/1992 | Pick | B03C 3/155 96/99 |
| 5,158,586 | A | * | 10/1992 | Layton | B01D 39/2034 55/497 |
| 5,243,632 | A | * | 9/1993 | Badin | G21C 17/00 210/451 |
| 5,273,563 | A | * | 12/1993 | Pasch | B01D 46/0005 55/497 |

(56) References Cited

U.S. PATENT DOCUMENTS

| | | | | |
|---|---|---|---|---|
| 5,273,564 A * | 12/1993 | Hill | B01D 46/0016 | 55/497 |
| 5,288,298 A * | 2/1994 | Aston | B01D 46/0038 | 96/135 |
| 5,330,559 A * | 7/1994 | Cheney | B03C 3/155 | 96/99 |
| 5,368,622 A * | 11/1994 | McMillon | B01D 46/521 | 55/497 |
| 5,426,679 A * | 6/1995 | Henriksson | B01D 29/68 | 210/98 |
| 5,458,667 A * | 10/1995 | Poggi, Jr. | B01D 46/0006 | 55/480 |
| 5,458,772 A * | 10/1995 | Eskes | B01D 29/05 | 210/473 |
| 5,478,469 A * | 12/1995 | Bryan | B01D 29/96 | 210/485 |
| 5,525,145 A * | 6/1996 | Hodge | B01D 46/10 | 55/516 |
| 5,531,892 A * | 7/1996 | Duffy | B01D 46/0016 | 55/497 |
| 5,571,300 A * | 11/1996 | Stemmer | B01D 46/10 | 55/DIG. 39 |
| 5,595,107 A * | 1/1997 | Bivens | B01D 29/055 | 210/167.28 |
| 5,620,505 A * | 4/1997 | Koch | B01D 46/0036 | 55/497 |
| 5,639,287 A * | 6/1997 | Van de Graaf | B01D 46/521 | 55/501 |
| 5,688,402 A * | 11/1997 | Green | B01D 29/036 | 210/415 |
| 5,696,801 A * | 12/1997 | Dwyer | G21C 19/307 | 376/282 |
| 5,743,927 A * | 4/1998 | Osendorf | B01D 46/521 | 55/497 |
| 5,759,398 A * | 6/1998 | Kielbowicz | B01D 29/33 | 210/489 |
| 5,759,399 A * | 6/1998 | Bilanin | B01D 29/92 | 210/416.1 |
| 5,782,944 A * | 7/1998 | Justice | B01D 46/10 | 55/497 |
| 5,792,228 A * | 8/1998 | Fath | B01D 46/10 | 55/497 |
| 5,835,549 A * | 11/1998 | Sibiga | B01D 29/333 | 210/493.1 |
| 5,840,094 A * | 11/1998 | Osendorf | B01D 46/0001 | 65/27 |
| 5,843,314 A * | 12/1998 | Dwyer | G21C 19/307 | 376/313 |
| 5,846,302 A * | 12/1998 | Putro | B03C 3/155 | 96/99 |
| 5,935,439 A * | 8/1999 | Hart | B01D 29/33 | 210/416.1 |
| 5,944,860 A * | 8/1999 | Mack | B01D 46/0005 | 55/497 |
| 5,958,097 A * | 9/1999 | Schlor | B29C 45/14336 | 264/254 |
| 5,958,234 A * | 9/1999 | Dwyer | G21C 19/307 | 376/313 |
| 5,965,016 A | 10/1999 | Suchowski et al. | | |
| 5,989,303 A * | 11/1999 | Hodge | B01D 46/0032 | 55/497 |
| 6,040,491 A * | 3/2000 | Sjowall | G21F 9/04 | 976/DIG. 395 |
| 6,074,450 A * | 6/2000 | Raber | B01D 46/523 | 55/497 |
| 6,099,612 A * | 8/2000 | Bartos | B01D 46/62 | 55/482 |
| 6,126,708 A * | 10/2000 | Mack | B01D 46/521 | 55/497 |
| 6,152,980 A * | 11/2000 | Culwell | B01D 46/521 | 55/501 |
| 6,165,240 A * | 12/2000 | Hodge | B01D 46/0036 | 55/497 |
| 6,197,188 B1 * | 3/2001 | Lamoureux | B01D 36/02 | 210/138 |
| 6,264,713 B1 * | 7/2001 | Lewis, II | B01D 46/521 | 55/502 |
| 6,280,491 B1 * | 8/2001 | Oke | B01D 46/71 | 55/482 |
| 6,319,300 B1 * | 11/2001 | Chen | B01D 46/10 | 55/497 |
| 6,325,928 B1 * | 12/2001 | Pedersen | B01D 63/04 | 210/321.89 |
| 6,328,778 B1 * | 12/2001 | Richerson | B01D 46/0002 | 55/482 |
| 6,398,839 B2 * | 6/2002 | Choi | B01D 29/07 | 55/501 |
| 6,406,509 B1 * | 6/2002 | Duffy | B01D 46/0001 | 55/497 |
| 6,464,745 B2 * | 10/2002 | Rivera | B01D 46/523 | 55/497 |
| 6,485,538 B1 * | 11/2002 | Toyoshima | B01D 46/58 | 55/482 |
| 6,491,818 B2 * | 12/2002 | Dwyer | G21C 19/307 | 376/310 |
| 6,502,909 B1 * | 1/2003 | Swilik, Jr. | B01D 46/10 | 312/263 |
| 6,521,011 B1 * | 2/2003 | Sundet | B01D 46/523 | 55/497 |
| 6,524,479 B2 * | 2/2003 | Schwinghammer | B01D 46/10 | 210/493.1 |
| 6,592,643 B2 * | 7/2003 | Shah | B01D 46/521 | 55/497 |
| 6,599,343 B2 * | 7/2003 | Fredrick | B01D 46/521 | 55/497 |
| 6,638,333 B2 * | 10/2003 | Schuld | B01D 46/10 | 55/497 |
| 6,652,613 B2 * | 11/2003 | Shah | B01D 46/0004 | 55/497 |
| 6,679,940 B1 * | 1/2004 | Oda | B03C 3/32 | 96/96 |
| 6,709,480 B2 * | 3/2004 | Sundet | B01D 46/0001 | 55/497 |
| 6,723,150 B2 * | 4/2004 | Parker | B01D 46/0005 | 55/497 |
| 6,764,533 B2 * | 7/2004 | Lobiondo, Jr. | B03C 3/155 | 96/66 |
| 6,790,360 B1 * | 9/2004 | Pedersen | B01D 61/18 | 210/636 |
| 6,814,660 B1 * | 11/2004 | Cavett | B01D 46/10 | 454/284 |
| 6,814,773 B2 * | 11/2004 | Shah | B01D 46/521 | 55/497 |
| 6,833,017 B2 * | 12/2004 | Quigley | B01D 46/521 | 55/497 |
| 6,860,916 B2 * | 3/2005 | Kubokawa | B01D 46/88 | 55/497 |
| 6,941,630 B2 * | 9/2005 | Wynn | H05K 7/20181 | 55/501 |
| 6,955,702 B2 * | 10/2005 | Kubokawa | B01D 46/523 | 55/501 |
| 7,004,989 B2 * | 2/2006 | Karlsson | B01D 46/523 | 55/497 |
| 7,025,806 B2 * | 4/2006 | Coppom | B03C 3/155 | 264/DIG. 48 |
| 7,037,354 B1 * | 5/2006 | Dimicelli | B01D 46/0002 | 55/497 |
| 7,048,501 B2 * | 5/2006 | Katayama | B01D 46/10 | 415/121.2 |
| 7,150,774 B2 * | 12/2006 | Kubokawa | B01D 29/96 | 55/501 |
| 7,156,891 B2 * | 1/2007 | Winters | B01D 46/10 | 55/497 |
| 7,156,898 B2 * | 1/2007 | Jaisinghani | B03C 3/155 | 55/497 |
| 7,169,202 B2 * | 1/2007 | Kubokawa | B01D 46/0016 | 55/497 |

(56) References Cited

U.S. PATENT DOCUMENTS

| | | | | |
|---|---|---|---|---|
| 7,211,190 B2* | 5/2007 | Kielbowicz | | B01D 29/52 210/232 |
| 7,217,333 B2* | 5/2007 | Sundet | | B01D 46/523 156/196 |
| D544,949 S * | 6/2007 | Winters | | D23/365 |
| 7,235,115 B2* | 6/2007 | Duffy | | B31D 5/0082 55/497 |
| 7,252,696 B2* | 8/2007 | Jenkins | | B01D 46/0005 55/490.1 |
| 7,261,757 B2* | 8/2007 | Duffy | | B01D 46/521 55/497 |
| 7,351,274 B2* | 4/2008 | Helt | | B03C 3/12 96/26 |
| 7,364,602 B2* | 4/2008 | Wu | | F24F 13/28 55/497 |
| 7,419,525 B2* | 9/2008 | Reamsnyder | | B01D 46/0001 210/490 |
| 7,452,396 B2* | 11/2008 | Terlson | | B01D 46/521 55/497 |
| 7,488,426 B1* | 2/2009 | Zaiter | | B01D 29/54 210/345 |
| 7,497,888 B2* | 3/2009 | Ashwood | | B01D 46/521 55/497 |
| 7,503,953 B2* | 3/2009 | Sundet | | B01D 46/46 55/497 |
| 7,513,933 B2* | 4/2009 | Coppom | | B03C 3/09 95/70 |
| 7,524,362 B2* | 4/2009 | Wu | | B01D 46/0005 96/417 |
| 7,537,630 B2* | 5/2009 | Schuld | | B01D 46/0005 55/495 |
| 7,537,632 B2* | 5/2009 | Miller | | B01D 46/521 55/497 |
| 7,608,135 B2* | 10/2009 | Mello | | B03C 3/09 96/99 |
| 7,727,299 B2* | 6/2010 | Knowles | | B01D 46/0005 55/DIG. 35 |
| 7,758,667 B2* | 7/2010 | Ashwood | | B01D 46/10 55/497 |
| 7,785,403 B2* | 8/2010 | Ouyang | | B03C 3/155 96/97 |
| 7,788,867 B2* | 9/2010 | Oates | | G21C 9/012 52/302.1 |
| 7,822,164 B1* | 10/2010 | Kielbowicz | | B01D 29/031 376/282 |
| 7,848,475 B2* | 12/2010 | Kaufman | | B01D 29/01 210/488 |
| 7,896,940 B2* | 3/2011 | Sundet | | B01D 46/0001 55/497 |
| 7,914,604 B2* | 3/2011 | Mello | | B03C 3/155 95/79 |
| 7,959,699 B2* | 6/2011 | Privitt | | B01D 46/0002 55/497 |
| 7,972,401 B2* | 7/2011 | Stock | | F02C 7/052 55/482 |
| 8,048,319 B2* | 11/2011 | Smith | | G21C 15/182 210/167.01 |
| 8,054,932 B2* | 11/2011 | Smith | | C02F 1/001 210/167.01 |
| 8,080,094 B2* | 12/2011 | Vanderginst | | B03C 3/09 96/99 |
| 8,123,939 B2* | 2/2012 | Chu | | G21F 9/36 588/20 |
| 8,157,881 B1* | 4/2012 | Anoszko | | B01D 46/0006 55/497 |
| 8,163,054 B1* | 4/2012 | McGrath | | B01D 46/10 55/497 |
| 8,182,571 B2* | 5/2012 | Kailani | | F24F 8/10 55/497 |
| 8,197,571 B2* | 6/2012 | Porter | | B01D 46/10 55/497 |
| 8,414,674 B2* | 4/2013 | Anoszko | | B01D 46/521 55/497 |
| 8,475,659 B2* | 7/2013 | Oh | | B01D 35/303 210/167.01 |
| 8,623,109 B2* | 1/2014 | Anoszko | | B01D 46/521 55/497 |
| 8,647,405 B2* | 2/2014 | Gray, Jr. | | B01D 46/0002 55/506 |
| 8,663,469 B2* | 3/2014 | Kim | | B01D 29/031 210/167.01 |
| 8,771,509 B2* | 7/2014 | Huang | | C02F 11/00 210/324 |
| 8,828,111 B2* | 9/2014 | Aycock | | B01D 46/10 55/497 |
| 8,877,054 B2* | 11/2014 | Andersen | | B01D 35/303 210/232 |
| 8,915,986 B2* | 12/2014 | O'Leary | | B01D 46/521 55/497 |
| 8,945,267 B2* | 2/2015 | Anoszko | | B01D 46/523 55/497 |
| 8,956,542 B1* | 2/2015 | Wakayama | | C02F 1/22 62/317 |
| D725,760 S * | 3/2015 | Nakagawa | | D23/365 |
| 8,974,668 B2* | 3/2015 | Kelada | | B01D 63/043 210/321.89 |
| 8,986,413 B2* | 3/2015 | Peteln | | B01D 47/00 55/482 |
| 9,011,568 B2 | 4/2015 | Girondi | | |
| 9,067,158 B2* | 6/2015 | Enbom | | B01D 46/0001 |
| 9,114,342 B2* | 8/2015 | Schuld | | B01D 46/0006 |
| 9,233,324 B2* | 1/2016 | Kielbowicz | | B01D 35/1475 |
| 9,266,045 B2* | 2/2016 | Kielbowicz | | B01D 35/1573 |
| 9,452,374 B2* | 9/2016 | Bernard | | A47J 37/1223 |
| 9,498,783 B2* | 11/2016 | Ackley | | B03C 3/47 |
| 9,541,302 B2* | 1/2017 | Taylor | | B01D 63/02 |
| 9,555,358 B2* | 1/2017 | Haufe | | B01D 46/0016 |
| 9,672,947 B2* | 6/2017 | Rhodes | | B01D 29/39 |
| 9,682,339 B2* | 6/2017 | Jursich | | B01D 46/4227 |
| 9,740,165 B2* | 8/2017 | Yamaguchi | | G03G 21/206 |
| 9,767,927 B2* | 9/2017 | Varrin, Jr. | | G21C 19/307 |
| 9,770,680 B2* | 9/2017 | Haque | | B01D 29/07 |
| 9,789,494 B2* | 10/2017 | Wiser, III | | B03C 3/41 |
| 9,993,113 B2* | 6/2018 | Bernard | | B01D 29/111 |
| 9,997,264 B2* | 6/2018 | Prather | | G21C 19/307 |
| 10,005,015 B2* | 6/2018 | Bowman | | B03C 3/82 |
| 10,071,331 B2* | 9/2018 | Hedlund | | B01D 46/0047 |
| D831,157 S * | 10/2018 | Kronk | | D23/209 |
| 10,213,721 B2* | 2/2019 | Elliott | | B01D 46/0005 |
| 10,286,351 B2* | 5/2019 | Schuld | | B01D 46/4227 |
| 10,369,507 B2* | 8/2019 | Hedlund | | B01D 46/56 |
| 10,427,077 B2* | 10/2019 | Baldinger | | B01D 46/10 |
| 10,603,616 B1* | 3/2020 | Nance | | B01D 46/0002 |
| 10,703,650 B2* | 7/2020 | Kelada | | B01D 63/0822 |
| 10,730,001 B2* | 8/2020 | Tate | | B01D 46/523 |
| 10,898,843 B2* | 1/2021 | Grimes | | B01D 39/12 |
| D910,161 S * | 2/2021 | Lambertson | | F24C 15/2035 D23/386 |
| 10,940,416 B2* | 3/2021 | Gregerson | | B01D 46/521 |
| 10,981,099 B2* | 4/2021 | Gregerson | | B01D 46/10 |
| D923,165 S * | 6/2021 | Guo | | D23/365 |
| 11,198,089 B2* | 12/2021 | Tate | | B01D 46/523 |
| 11,293,653 B1* | 4/2022 | Burnett | | F24F 8/00 |
| 11,361,870 B2* | 6/2022 | Rhodes | | G21D 1/02 |
| D972,698 S * | 12/2022 | Gregerson | | D23/365 |
| D980,401 S * | 3/2023 | Kenadzir | | D23/365 |
| 11,648,497 B2* | 5/2023 | Bowman | | B03C 3/82 55/502 |
| 2002/0148766 A1* | 10/2002 | Dwyer | | G21C 19/307 210/315 |
| 2003/0070406 A1* | 4/2003 | Duffy | | B01D 35/30 55/497 |
| 2003/0141240 A1* | 7/2003 | Shiraishi | | B01D 35/30 210/350 |
| 2003/0159415 A1* | 8/2003 | Parker | | B01D 46/0006 55/506 |
| 2003/0230063 A1* | 12/2003 | Kubokawa | | B01D 46/10 55/497 |

(56) References Cited

U.S. PATENT DOCUMENTS

| | | | | |
|---|---|---|---|---|
| 2004/0182055 | A1* | 9/2004 | Wynn | B01D 46/10 55/497 |
| 2004/0206679 | A1* | 10/2004 | Bleigh | B01D 35/303 210/97 |
| 2005/0109204 | A1* | 5/2005 | Coppom | B03C 3/155 96/66 |
| 2005/0138906 | A1* | 6/2005 | Kubokawa | B01D 46/523 55/497 |
| 2005/0167355 | A1* | 8/2005 | Kielbowicz | B01D 29/031 210/416.1 |
| 2005/0284116 | A1* | 12/2005 | Duffy | B01D 46/0001 55/497 |
| 2006/0005517 | A1* | 1/2006 | Sundet | B01D 46/0001 55/497 |
| 2006/0053759 | A1* | 3/2006 | Winters | B01D 46/0016 55/497 |
| 2006/0075697 | A1* | 4/2006 | Oates | G21C 15/18 52/177 |
| 2006/0180023 | A1* | 8/2006 | Coppom | B03C 3/09 95/59 |
| 2006/0219645 | A1* | 10/2006 | Bilanin | B01D 29/86 210/791 |
| 2006/0277879 | A1* | 12/2006 | Knowles | B01D 46/10 55/497 |
| 2007/0039472 | A1* | 2/2007 | Bias | B03C 3/09 96/77 |
| 2007/0045166 | A1* | 3/2007 | Fanning | F16L 27/113 210/488 |
| 2007/0084782 | A1* | 4/2007 | Smith | B01D 29/15 210/323.2 |
| 2007/0138072 | A1* | 6/2007 | Bilannin | E02B 5/085 210/153 |
| 2007/0204575 | A1* | 9/2007 | Lisbona | B01D 46/10 55/495 |
| 2007/0294988 | A1* | 12/2007 | Miller | B01D 46/0002 55/501 |
| 2008/0156712 | A1* | 7/2008 | Rhodes | B01D 29/39 210/498 |
| 2008/0184685 | A1* | 8/2008 | Kempf | B01D 46/0005 55/497 |
| 2008/0202078 | A1* | 8/2008 | Healey | B01D 46/16 55/484 |
| 2008/0223779 | A1* | 9/2008 | Kaufman | B01D 29/01 210/493.5 |
| 2008/0245719 | A1 | 10/2008 | Beard et al. | |
| 2008/0286163 | A1* | 11/2008 | Garfield | A61L 9/205 427/532 |
| 2009/0025402 | A1* | 1/2009 | Mello | B03C 3/12 62/78 |
| 2009/0025559 | A1* | 1/2009 | Mello | F24F 8/192 96/57 |
| 2009/0126326 | A1* | 5/2009 | McClellan | B01D 46/521 55/497 |
| 2009/0151312 | A1* | 6/2009 | Ashwood | F24F 13/28 55/511 |
| 2009/0183474 | A1* | 7/2009 | Workman | B01D 46/521 55/385.2 |
| 2009/0184064 | A1* | 7/2009 | Zaiter | B01D 29/54 210/170.01 |
| 2009/0249957 | A1* | 10/2009 | Lackey, Sr. | B01D 46/0002 96/11 |
| 2010/0025315 | A1* | 2/2010 | Smith | B01D 29/15 210/232 |
| 2010/0251895 | A1* | 10/2010 | VanDerGinst | B03C 3/66 96/83 |
| 2010/0269467 | A1* | 10/2010 | Crabtree | B01D 46/10 55/497 |
| 2010/0269468 | A1* | 10/2010 | Crabtree | B01D 46/10 55/499 |
| 2010/0276124 | A1 | 11/2010 | Klarner | |
| 2010/0313757 | A1* | 12/2010 | Crabtree | B01D 46/0005 53/473 |
| 2010/0313760 | A1* | 12/2010 | Crabtree | B01D 39/1623 55/385.6 |
| 2011/0084008 | A1* | 4/2011 | Kielbowicz | B01D 35/1475 210/315 |
| 2011/0084009 | A1* | 4/2011 | Kielbowicz | B01D 35/1475 210/335 |
| 2011/0164719 | A1* | 7/2011 | Aleshin | G21C 19/307 376/313 |
| 2011/0186504 | A1* | 8/2011 | Rocklitz | B01D 46/525 210/493.1 |
| 2011/0215059 | A1* | 9/2011 | Smith | B01D 29/58 210/232 |
| 2011/0297627 | A1* | 12/2011 | Oh | B01D 29/03 210/806 |
| 2012/0037572 | A1* | 2/2012 | Kim | B01D 29/52 210/417 |
| 2012/0167535 | A1* | 7/2012 | Underwood | B01D 46/0001 55/497 |
| 2012/0223008 | A1* | 9/2012 | Mbadinga-Mouanda | B01D 39/14 210/493.5 |
| 2012/0273407 | A1* | 11/2012 | Haque | G21D 1/04 210/335 |
| 2012/0291406 | A1* | 11/2012 | Crabtree | B01D 46/58 55/482 |
| 2012/0304862 | A1* | 12/2012 | Taylor | B01D 53/268 96/10 |
| 2012/0311978 | A1* | 12/2012 | Crabtree | B01D 46/10 55/385.2 |
| 2012/0317940 | A1* | 12/2012 | Ball | B01D 46/52 55/497 |
| 2012/0317941 | A1* | 12/2012 | Crabtree | B01D 46/121 55/385.2 |
| 2012/0318144 | A1* | 12/2012 | Crabtree | F24F 8/108 55/482 |
| 2012/0324848 | A1* | 12/2012 | Enbom | B01D 46/521 55/497 |
| 2013/0031884 | A1* | 2/2013 | Gray, Jr. | B01D 46/0002 55/481 |
| 2013/0170601 | A1 | 7/2013 | Varrin, Jr. et al. | |
| 2013/0208847 | A1* | 8/2013 | Prather | B01D 29/58 376/309 |
| 2013/0256236 | A1* | 10/2013 | Huang | C02F 11/121 210/411 |
| 2014/0064429 | A1* | 3/2014 | Bleigh | G21C 15/18 376/313 |
| 2014/0096680 | A1* | 4/2014 | Ackley | B03C 3/47 96/24 |
| 2014/0109768 | A1* | 4/2014 | Bowman | B01D 46/2411 55/502 |
| 2014/0165839 | A1* | 6/2014 | Crabtree | B01D 46/522 55/497 |
| 2014/0197091 | A1* | 7/2014 | Andersen | B01D 35/303 210/323.2 |
| 2014/0231333 | A1* | 8/2014 | Kelada | B01D 63/021 156/305 |
| 2015/0013287 | A1* | 1/2015 | Yamaguchi | B01D 46/0002 55/497 |
| 2015/0265959 | A1* | 9/2015 | Crabtree | A01K 1/0064 55/482 |
| 2015/0267927 | A1* | 9/2015 | Zhang | B01D 46/521 55/497 |
| 2015/0318063 | A1 | 11/2015 | Loewen et al. | |
| 2016/0067647 | A1* | 3/2016 | Tate | B01D 46/10 156/219 |
| 2016/0214050 | A1* | 7/2016 | Dralle | B01D 46/10 |
| 2016/0282000 | A1* | 9/2016 | Noh | F24F 8/192 |
| 2016/0367080 | A1* | 12/2016 | Bernard | A47J 37/1223 |
| 2017/0284077 | A1 | 10/2017 | Deurloo | |
| 2018/0185970 | A1* | 7/2018 | Simmons | B01D 46/0005 |
| 2018/0207572 | A1* | 7/2018 | Grimes | B01D 46/4245 |
| 2019/0046909 | A1* | 2/2019 | Haas | B29C 45/14 |
| 2019/0217239 | A1* | 7/2019 | Gregerson | B01D 46/10 |
| 2020/0129907 | A1* | 4/2020 | Fox | B01D 46/0001 |
| 2020/0330905 | A1* | 10/2020 | Dam | B01D 29/56 |
| 2021/0202120 | A1* | 7/2021 | Bezlepkin | B01D 29/52 |

(56) References Cited

U.S. PATENT DOCUMENTS

| | | | |
|---|---|---|---|
| 2022/0288524 A1* | 9/2022 | Witter | B01D 46/79 |
| 2022/0297039 A1* | 9/2022 | Mashburn | B01D 46/0032 |
| 2023/0271114 A1* | 8/2023 | Dam | C02F 1/004 |
| | | | 210/489 |

FOREIGN PATENT DOCUMENTS

| | | |
|---|---|---|
| TW | 201727663 A | 8/2017 |
| WO | 2010076315 A2 | 7/2010 |

OTHER PUBLICATIONS

An office action issued in the corresponding Canadian Patent Application No. 3,078,556, dated May 30, 2023, issued by the Canadian Intellectual Property Office.
An office action issued in the corresponding Chinese Patent Application No. 201880079068.X, dated Feb. 8, 2023, issued by the Chinese Intellectual Property Office.
An office action issued in the corresponding Korean Patent Application No. 10-2020-7012802, dated May 22, 2023, issued by the Korean Patent Office.

* cited by examiner

METHOD AND APPARATUS FOR FILTERING FLUID IN NUCLEAR POWER GENERATION

CROSS-REFERENCE TO RELATED APPLICATION

This application is a divisional patent application of U.S. patent application Ser. No. 16/754,113, filed Apr. 6, 2020, which claims all benefit, including priority to International Patent (PCT) Application No. PCT/CA2018/051259, filed Oct. 5, 2018, and entitled, "METHOD AND APPARATUS FOR FILTERING FLUID IN NUCLEAR POWER GENERATION", and claims all benefit, including priority, of that application and of: U.S. Provisional Patent Application No. 62/569,324, filed Oct. 6, 2017, and entitled "METHOD AND APPARATUS FOR FILTERING FLUID IN NUCLEAR POWER GENERATION". Each of these are hereby incorporated by reference in their entireties.

FIELD

This relates to filtering fluids, and in particular, to filtering matter from cooling water in a nuclear power generation plant.

BACKGROUND

Nuclear power generation facilities use large volumes of water, circulated through one or more loops for purposes such as cooling system components. Water is collected, for example, in a sump, and re-circulated.

As water is circulated through system components, debris such as particulate and fibrous matter may become entrained. Such matter may lead to a risk of fouling system components. Water may therefore be filtered prior to recirculation.

Filter performance may be impacted by parameters such as the filter surface area and pore size. Performance requirements may include fluid throughput or debris removal rates, and pressure head losses. Very fine filters may remove small debris, albeit at the cost of large pressure losses. Conversely, coarse filters may remove larger debris, albeit at the cost of passthrough of smaller particles or fibres. Filter surface area may be constrained by the physical space available.

SUMMARY

An example filtering apparatus for a fluid intake of a nuclear power generation facility comprises: a primary frame defining a primary enclosed volume, at least one inlet opening in fluid communication with the enclosed volume, and at least one outlet opening in fluid communication with the fluid intake; a primary filter supported on the frame and covering the at least one inlet opening such that fluid passes into the enclosed volume through the primary filter; a secondary frame within the primary enclosed volume; a secondary filter supported on the secondary frame defining an enclosed flow passage in communication with the at least one outlet opening, such that fluid passes into the at least one outlet opening through the secondary filter and the enclosed flow passage.

In some embodiments, the secondary filter may be wrapped around the secondary frame to enclose the enclosed flow passage.

In some embodiments, the secondary filter may circumscribe the enclosed flow passage.

In some embodiments, the secondary filter may define a cylindrical filtering surface.

In some embodiments, the secondary filter may define a filtering surface having a plurality of polygonal sides.

In some embodiments, the plurality of polygonal sides of the second filter are supported around the perimeter of each side by the secondary frame.

In some embodiments, the secondary filter may be welded to the secondary frame.

In some embodiments, the filtering apparatus may comprise a plurality of the secondary frames forming a corrugation having a plurality of peaks to support the primary filter and the secondary filter, the secondary filter supported on each of the secondary frames, each secondary filter defining an enclosed flow passage in communication with a respective outlet opening.

In some embodiments, the secondary frames are angled with respect to fluid flowing through the secondary filter such that the fluid forces secondary frames adjacent each peak toward each other to bias the peaks toward the secondary filter.

In some embodiments, the total surface area of the secondary filters may be at least 5% of the surface area of the primary filter.

In some embodiments, the total surface area of the secondary filters may be at least 10% of the surface area of the primary filter.

In some embodiments, the total surface area of the secondary filters may be at least 20% of the surface area of the primary filter.

In some embodiments, the total surface area of the secondary filters may be at least 40% of the surface area of the primary filter.

In some embodiments, the primary filter has a pore size larger than a pore size of the secondary filter.

An example fluid filtering apparatus for a nuclear power generation facility, comprises: a fluid conduit; a plurality of filter modules, each in communication with the fluid conduit for drawing fluid into the fluid conduit through the filter modules. Each filter module comprises: a primary frame defining a primary enclosed volume, at least one inlet opening in fluid communication with the enclosed volume, and at least one outlet opening in fluid communication with the fluid conduit; a primary filter supported on the frame and covering the at least one inlet opening such that fluid passes into the enclosed volume through the primary filter; a secondary frame within the primary enclosed volume; a secondary filter supported on the secondary frame defining an enclosed flow passage in communication with the at least one outlet opening, such that fluid passes into the at least one outlet opening through the secondary filter and the enclosed flow passage.

In some embodiments, the secondary filter is wrapped around the secondary frame to enclose the enclosed flow passage.

In some embodiments, the secondary filter circumscribes the enclosed flow passage.

In some embodiments, the secondary filter defines a cylindrical filtering surface.

In some embodiments, the secondary filter defines a filtering surface having a plurality of polygonal sides.

In some embodiments, the plurality of polygonal sides of the second filter are supported around the perimeter of each side by the secondary frame.

In some embodiments, the secondary filter is welded to the secondary frame.

In some embodiments, the filtering apparatus comprises a plurality of the secondary frames forming a corrugation having a plurality of peaks to support the primary filter and the secondary filter, the secondary filter supported on each of the secondary frames, each secondary filter defining an enclosed flow passage in communication with a respective outlet opening.

In some embodiments, the secondary frames are angled with respect to fluid flowing through the secondary filter such that the fluid forces secondary frames adjacent each peak toward each other to bias the peaks toward the secondary frame.

In some embodiments, the total surface area of the secondary filters is at least 5% of the surface area of the primary filter.

In some embodiments, the total surface area of the secondary filters is at least 10% the surface area of the primary filter.

In some embodiments, the total surface area of the secondary filters is at least 20% of the surface area of the primary filter.

In some embodiments, the total surface area of the secondary filters is at least 40% of the surface area of the primary filter.

In some embodiments, the primary filter has a pore size larger than a pore size of the secondary filter.

In some embodiments, the fluid conduit is in communication with a fluid recirculation pump.

In some embodiments, the fluid conduit comprises a sump.

In some embodiments, the fluid conduit comprises a manifold.

Embodiments according to the present disclosure may include combinations of the above features.

DETAILED DESCRIPTION

Figure 1:
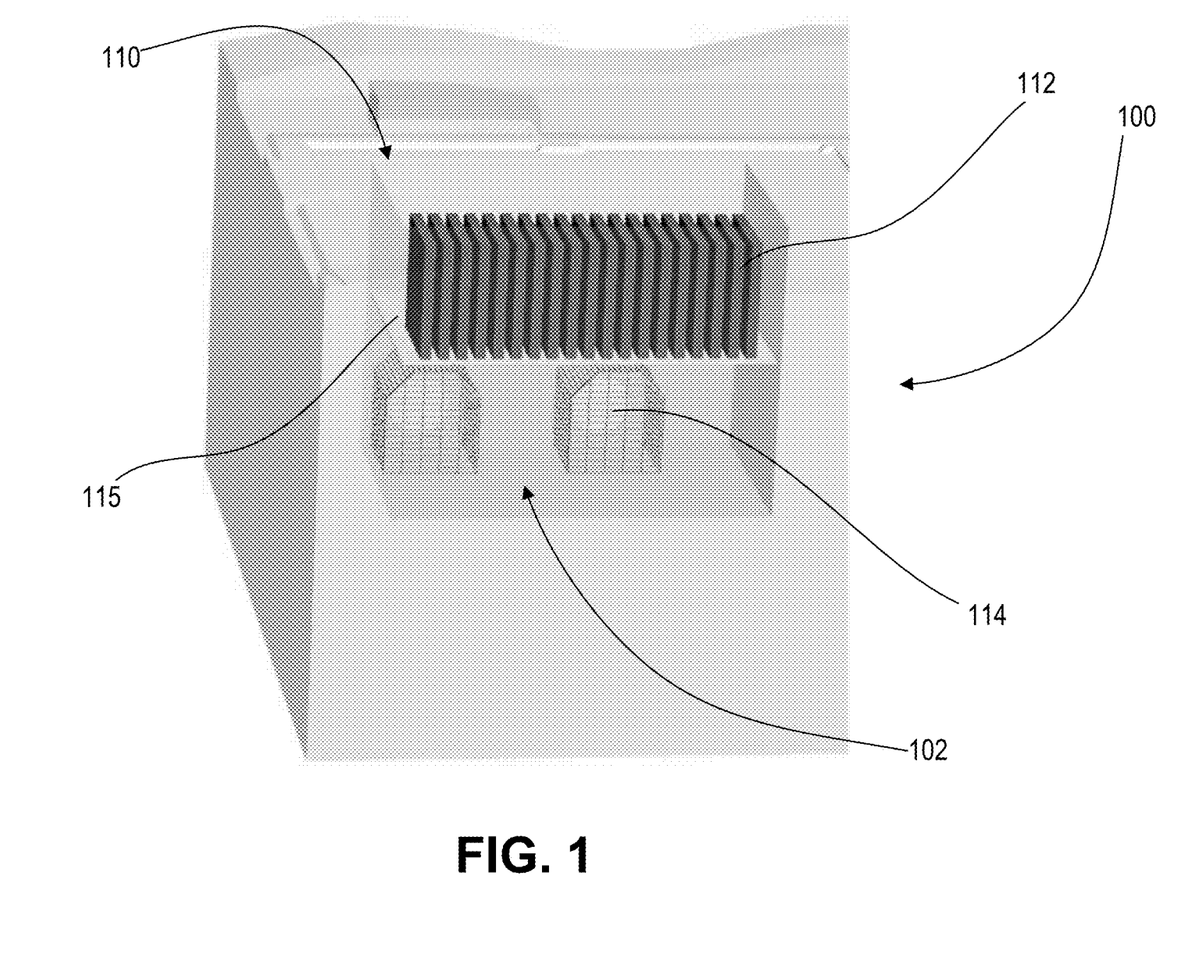
FIG. 1 is an isometric view of a fluid recirculation intake system.

FIG. 1 depicts an example recirculation intake system 100 of a nuclear power generation facility. Recirculation intake system 100 collects fluid such as cooling water after circulation through systems of the nuclear power generation facility, for subsequent re-circulation.

During circulation of fluid, particulate and fibrous matter may become entrained. For example, cooling fluid may accumulate fibres, paint chips, dirt, sludge and other debris such as dislodged insulation. Recirculation intake system 100 is designed to filter such debris prior to fluid recirculation.

Facility design specifications or regulatory requirements may define performance criteria for recirculation intake system 100. For example, such criteria may define a minimum fluid throughput rate, a maximum acceptable passage rate of particulate matter, and a maximum particle size that is capable of passing through recirculation intake system 100. Such criteria may lie in tension with design constraints including the physical space limitations of the sump system 100 and the maximum flow restriction, e.g. the maximum allowable pressure drop across recirculation intake system 100 at a particular flow rate or range of flow rates.

Recirculation intake system 100 forms part of the cooling subsystem of the nuclear power generation facility and therefore may critical to safety. Failure of recirculation intake system 100 could potentially lead to a loss of cooling, for example, if the recirculation intake system 100 were to become occluded or otherwise excessively restrict fluid flow.

Recirculation intake system 100 may further be subject to structural performance criteria. For example, recirculation intake system 100 may be designed with sufficient strength to withstand physical impact or seismic events.

Recirculation intake system 100 may include a sump pit 102. Fluid collects in sump pit 102 and is drawn under suction through one or more suction inlets 114 for recirculation.

In the depicted embodiment, suction inlet 114 is positioned within sump pit 102. Suction inlet 114 communicates with a pumping device, which draws fluid from sump pit 102 into suction inlet 114 for recirculation. Such communication may be, e.g., by way of a duct. Suction inlet 114 is enclosed such that fluid passes through filter assembly 110 before entering suction inlet 114. In the depicted embodiment, suction inlet 114 is enclosed by sump pit 102 and filter assembly 110. That is, fluid drawn into suction inlet 114 passes through filter assembly 110 into sump pit 102 and then into suction inlet 114. Filter assembly 110 includes a plurality of filter cartridges 112, which communicate with sump pit 102 through an inlet plate 115. Each filter cartridge 112 mates to a corresponding inlet aperture (not shown) in inlet plate 115.

Filter assembly 110 may be designed to provide a large filtering surface area within a constrained spatial envelope. For example, in the depicted embodiment, filter assembly 110 is configured to lie within the area overlying sump pit 102. In some embodiments, filter assembly 110 may be subject to other spatial constraints, such as height and volume limits.

Figure 2:
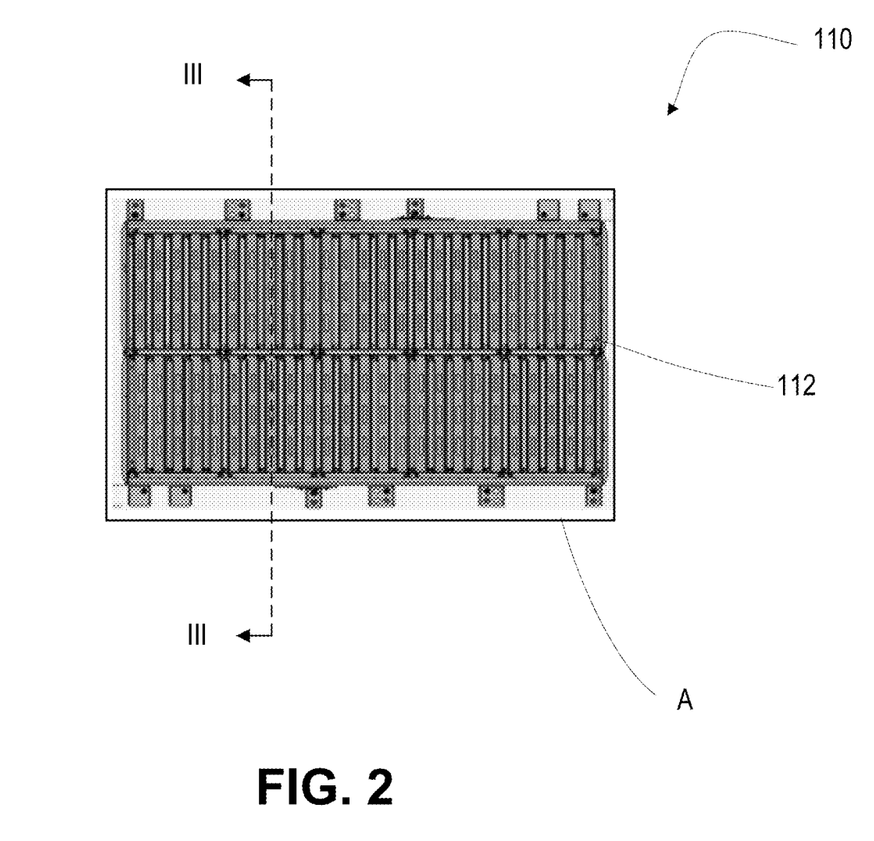
FIG. 2 is a top plan view of the fluid recirculation intake system of FIG. 1.

FIG. 2 depicts an overhead plan view of filter assembly 110. As depicted, cartridges 112 are arranged in parallel rows. Adjacent filter cartridges 112 are spaced closely together for high packing density, while permitting sufficient space for fluid flow. As noted, filter cartridges 112 lie within an area A circumscribing sump pit 102.

Figure 3:
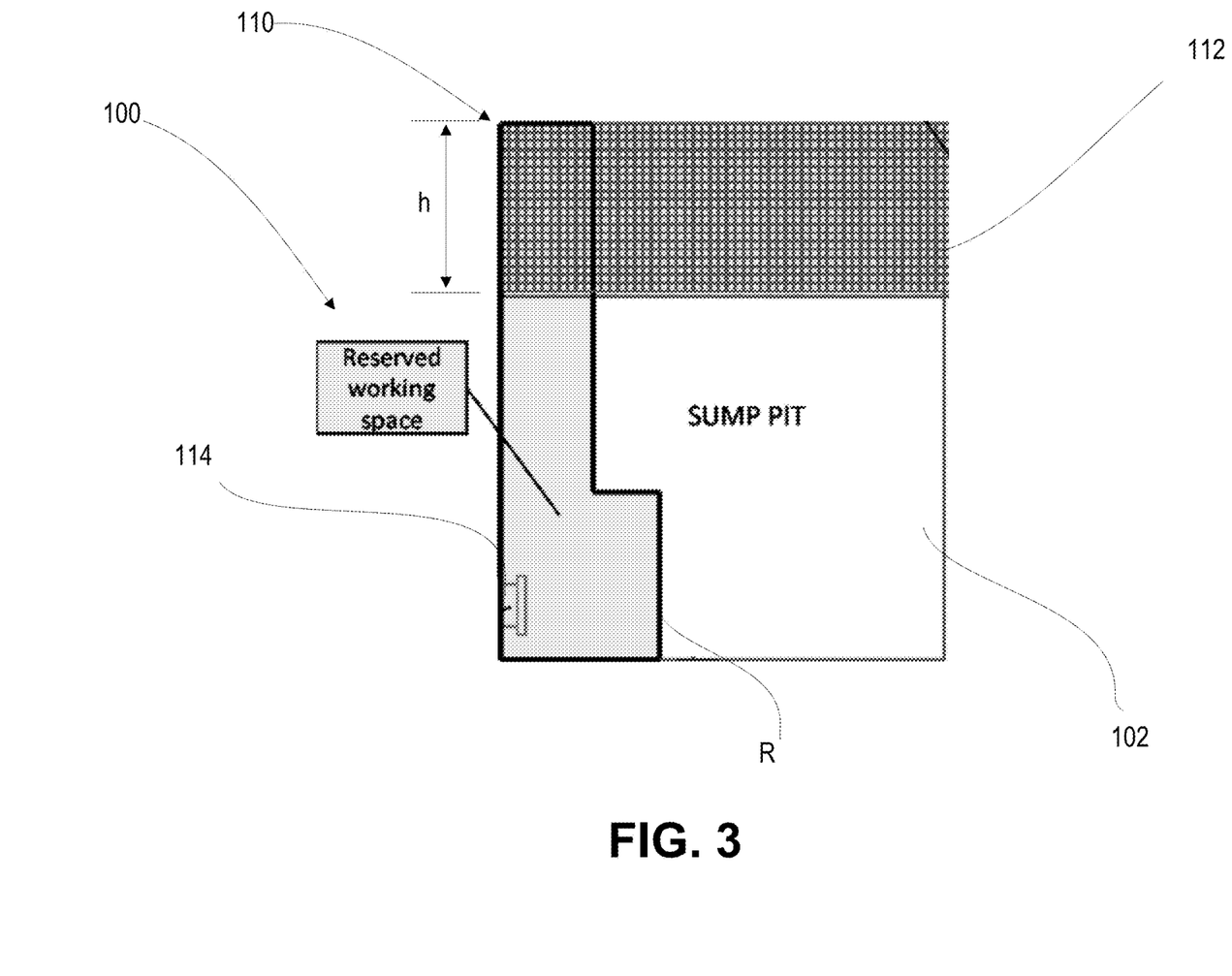
FIG. 3 is a side cross-sectional view of the fluid recirculation intake system of FIG. 1, along line III-III shown in FIG. 2.

FIG. 3 depicts a cross-sectional view of an example recirculation intake system 100, showing filter cartridges 112, sump pit 102 and suction inlet 114. As shown, designs may specify a maximum height h for filter assembly 110. As shown, the maximum height h is defined by reference to the top of sump pit 102. Alternatively or additionally, maximum height h may be defined relative to other components. The maximum height may be defined, for example, to avoid interference with other system components.

One or more reserved regions R may be defined within sump pit 102 or outside sump pit 102. Reserved regions R may be specified as being free of components such as filter cartridges 112. Reserved regions R may, for example, provide working space for maintenance purposes, or provide clearance for system components.

The spatial constraints shown and described with reference to FIGS. 2-3 are examples only. Specific constraints applicable to any given power generation facility may vary. However, the space available to accommodate filtering assembly 110 is generally subject to stringent constraints, such that the ratio providing sufficient filtering surface area requires a high ratio of filtering area to external dimensions of filter cartridges 112.

Figure 4:
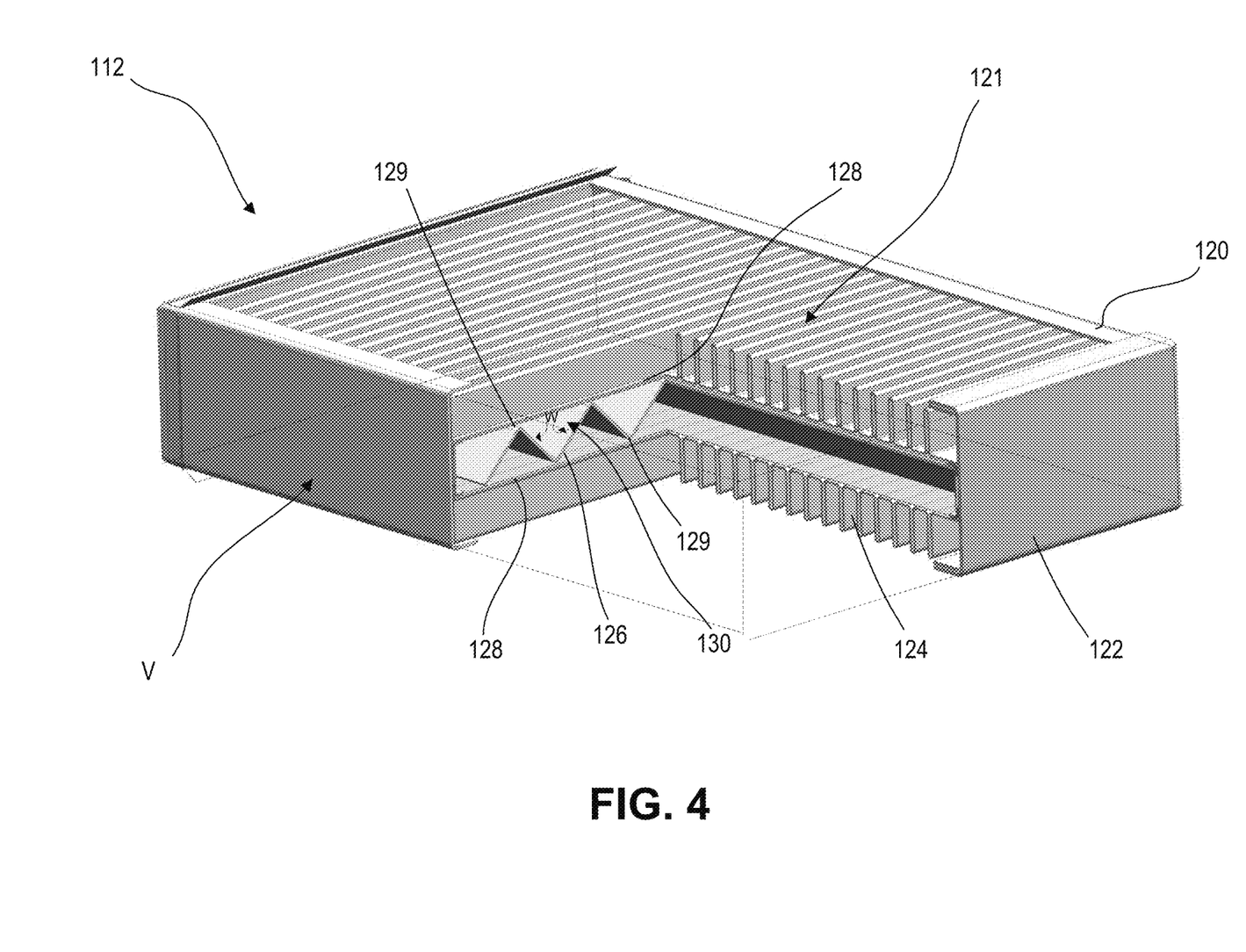
FIG. 4 is an isometric partial cutaway view of a filter cartridge of the fluid recirculation intake system of FIG. 1.

FIG. 4 depicts an example filter cartridge 112. Filter cartridge 112 has a frame 120 with a plurality of walls 122. Frame 120 defines an enclosed volume V, namely, a volume circumscribed by the members of frame 120. In the depicted embodiment, frame 120 includes top and bottom walls 122 and end walls 122.

One of the end walls 122 of frame 120 is configured to mate to an inlet aperture of inlet plate 115 and has one or more outlets (not shown) through which the enclosed volume V is in fluid communication with sump pit 102.

A primary filter 124 is supported on frame 120. As depicted, primary filter 124 occupies each of the lateral faces of filter cartridge 112. In the depicted embodiment, primary filter 124 is folded to define a plurality of corrugations or ridges. Each ridge extends generally in the transverse direction of filter cartridge 112 and has opposing side surfaces and an end surface, each of which may include perforations for passage of fluid. Thus, the ridges provide an increased fluid filtering area, relative to a flat filter. The ridges may also increase stiffness of the primary filter 124. That is, the ridges may increase resistance to bending about directions perpendicular to the orientation of the ridges.

Fluid may be drawn through primary filter 124 and into the enclosed volume V. Primary filter 124 may be formed, for example, of perforated metal plate or mesh screen. As fluid passes through primary filter 124, the filter removes at least some debris entrained in the fluid. Some debris, referred to hereinafter as bypass debris, pass through filter 124 along with the fluid. The size and quantity of bypass debris depends on the pore size of primary filter 124, the area of primary filter 124 and the spacing between pores, i.e. the proportion of the filter area that is occupied by open pores. As used herein, the term "pores" includes perforations in sheet plate filters and open interstices in mesh screen filters.

Generally, filters 124 having smaller pore sizes and smaller total pore area (e.g. fewer pores) permit less pass through debris. For example, the size of pores defines the largest debris able to pass through filter 124. In other words, finer screens permit only smaller debris to pass. However, smaller pore sizes and smaller total pore area also generally impose greater flow restriction causing greater pressure loss (i.e. pressure head loss) across the filter. Therefore, filtering performance must be balanced against flow restriction.

In the embodiment of FIG. 4, primary filter 124 is further supported by internal secondary frame 126. As shown, secondary frame 126 comprises a series of triangular struts forming a corrugation having a plurality of peaks 129. The struts extend in the longitudinal direction of filter cartridge 112 and provide physical reinforcement to primary filter 124.

Filter cartridge 112 further includes a secondary filter 128 supported by internal secondary frame 126. As depicted in FIG. 4, secondary filter 128 is a flat sheet positioned on secondary frame 126. Secondary filter 128 may be formed, for example, of perforated metal sheet or mesh screen. The plurality of peaks 129 of the secondary frame 126 support the secondary filter 128 and may also support the primary filter 124. That is, the secondary frames 126 are angled with respect the secondary filter 128 such that fluid flowing through the secondary filter 128, illustrated as W, forces frames adjacent each peak toward each other to bias the peaks 129 toward the secondary filter 128 to support the secondary filter 128, and also primary filter 124 in an embodiment. As illustrated in FIG. 4 the peaks of secondary frame 126 may extend generally perpendicular to the ridges of primary filter 124.

Secondary filter 128 and secondary frame 126 cooperate to define enclosed fluid passages 130. Each fluid passage 130 communicates with a respective outlet into sump pit 102. Thus, in order to pass into sump pit 102, fluid must pass through primary filter 124 into enclosed volume V and then through secondary filter 128 into a fluid passage 130 and ultimately into sump pit 102. Specifically, fluid enters filter cartridge 112 through primary filters 124 at the lateral faces of the cartridge, and then passes through secondary filter 128 and flows in a generally longitudinal direction along flow passages 130 and through the outlets into sump pit 102.

Filter cartridge 112 permits very little passthrough of debris, but also imposes relatively small flow restriction. For example, a subset of entrained debris is separated from cooling fluid as the fluid passes through primary filter 124. Debris that passes through primary filter 124 is at least partially separated from cooling fluid as it passes through secondary filter 128.

In the design of filter cartridge 112, very fine filter sizes may be used for high filtering performance, while maintaining acceptable pressure head loss due to filtering flow restriction.

In some examples, particulate bypass limits are defined in terms of the maximum acceptable quantity of bypass material that can pass to the core. Such limits may be defined by regulations, operational considerations, or a combination thereof. In some examples, limits may be as low as several grams per fuel assembly of the power generation station. In other examples the target bypass requirement is 15 grams per fuel assembly of the power generation station.

Filtering performance may be substantially increased with reduced filter pore size. Specifically, bypass material quantity tends to be reduced for fine (e.g. 80 mesh) screens, relative to coarser filters (e.g. 1/16" perforated). Unfortunately, fine filters are prone to clogging. For example, filtered material can build up on a filtering element and partially or fully occlude its pores. Clogging due to a thin bed of debris may result in a sharp increase in pressure head loss across the filter.

Thin bed clogging correlates to the debris load of fluid passing through the filter, i.e., the amount of debris entrained in the fluid flow. Large quantities of debris are more likely to build up on the filter and cause clogging. The filter pore size also influences the likelihood of clogging. Filters with smaller pore sizes are generally more likely to clog.

Debris loads in some power generation facilities is such that fine filters, e.g. 80 mesh screens, are likely to experience thin bed clogging.

In some embodiments, filter cartridge 112 may have a primary filter 124 and a secondary filter 128 of different pore sizes. Specifically, the pore size of primary filter 124 may be larger than that of secondary filter 128. Such configurations may deliver the low bypass performance associated with fine filters, while limiting pressure head loss and limiting risk of thin bed clogging. Generally, primary filter 124 may be designed to remove larger debris to minimize clogging of the secondary filter 128 such that the secondary filter can maintain a design bypass requirement.

In a specific example, primary filter 124 may be formed of perforated plate, for example, with 1/16" perforations. Secondary filter 128 may be formed of 80 mesh metal screen. As fluid is drawn through filtering cartridge 112 toward suction inlet 114, the fluid passes through primary filter 124 and secondary filter 128 in turn. Fluid passes relatively easily through primary filter 124, i.e. with relatively little flow restriction. Primary filter 124 removes some debris from the fluid, particularly large debris, but permits passage of a relatively large quantity of debris passthrough. Thus, the fluid passing through secondary filter 128 carries a smaller quantity of debris than that passing through primary filter 124. Moreover, the debris removed by secondary filter 128 tends to be of smaller size than that removed by primary filter 124. In other words, debris is removed in two stages. This two-stage filtering tends to provide some protection against clogging and tends to impose lower pressure head loss, relative to a single-stage filter of equivalent pass through performance.

In an another example, fluid passing through primary filter 124 will deposit debris on primary filter 124. The debris, for example fibers, may stack and overtime reduce the effective pore size of the primary filter 124, permitting primary filter 124 to smaller size debris to collect on primary filter 124.

In other embodiments, primary and secondary filters 124, 128 may have the same pore size. Two-stage filtering may provide reduced pass through, relative to a single-stage filter of the same pore size. Debris passing through the first filter may be further reduced at the second filter. Thus, passthrough may be reduced without imposing pressure head losses associated with a finer filter.

Moreover, the configuration of filter 112 is particularly space-efficient. Specifically, two filtering stages fit within the periphery of primary frame 120. Thus, a second stage of filtering is provided without impacting the density at which filtering cartridges 112 are spaced.

As shown in FIG. 4, secondary filter 128 of filter cartridge 112 is a flat plate or screen. In some embodiments, the secondary filter may be a three-dimensional structure.

Figure 5:
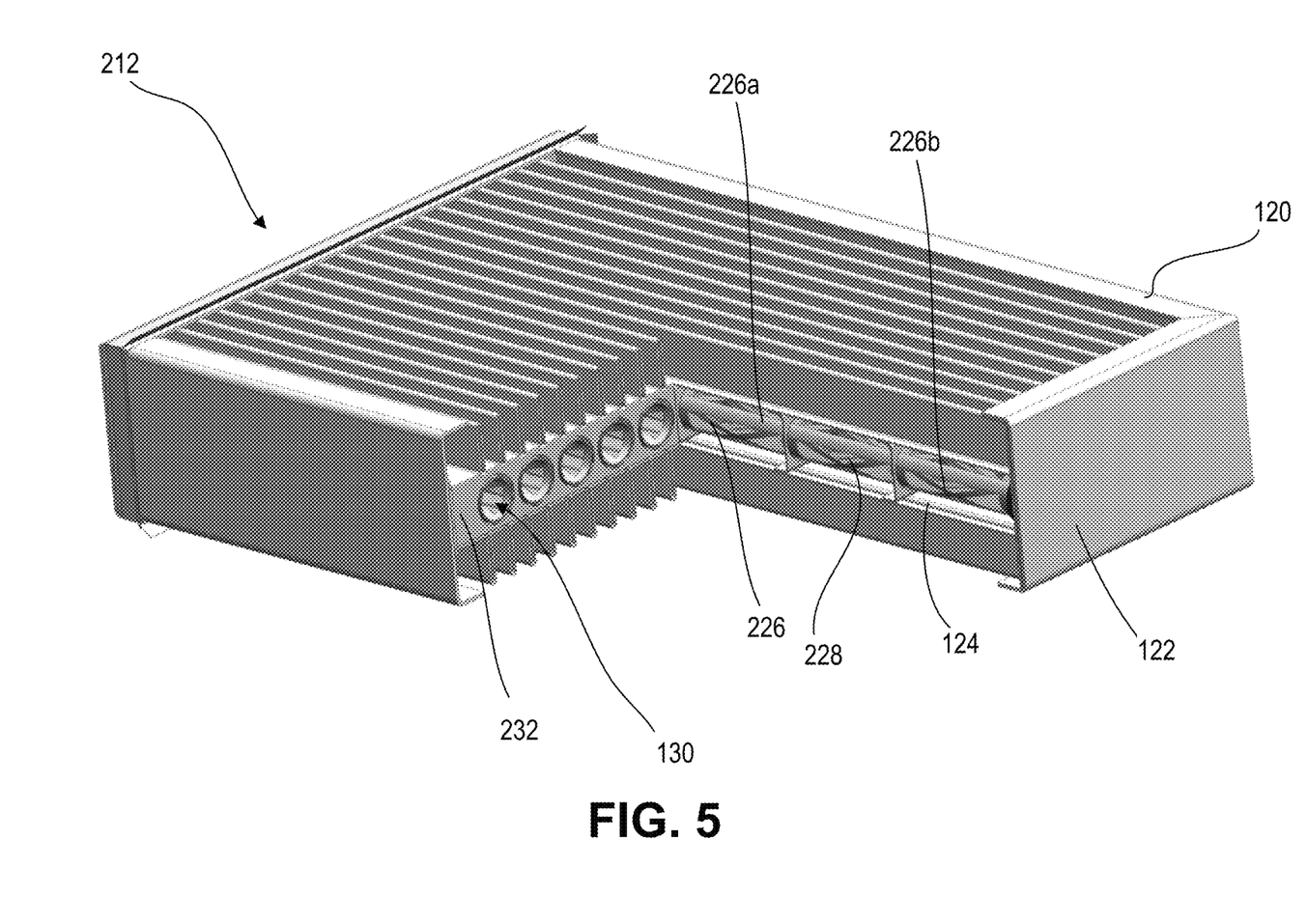
FIG. 5 is an isometric partial cutaway view of another filter cartridge.
Figure 6:
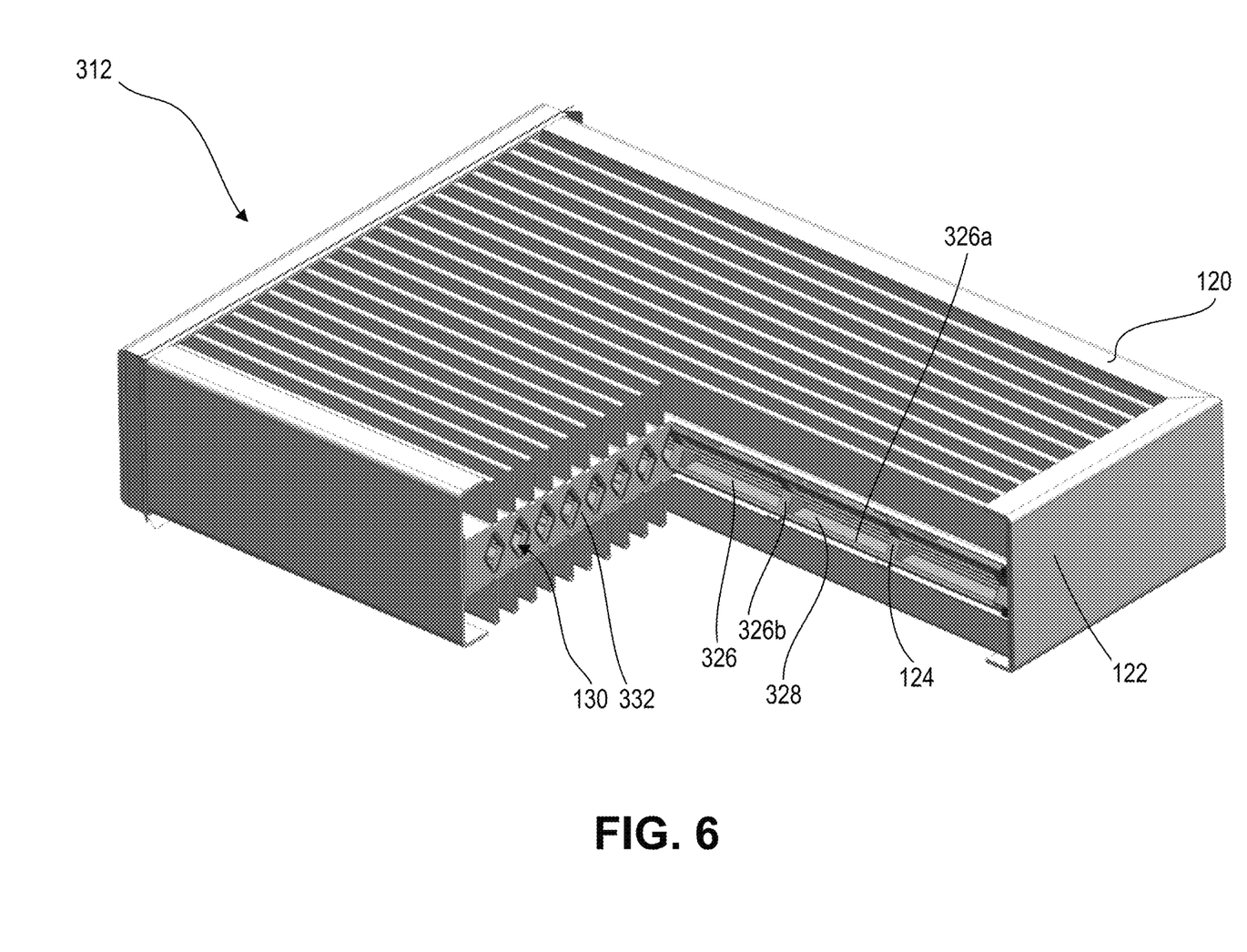
FIG. 6 is an isometric partial cutaway view of another filter cartridge.

FIGS. 5-6 depict example filter cartridges 212, 312 with such secondary filters 228, 328. Filter cartridges 212, 312 are generally similar to filter cartridge 112. Like components thereof are indicated with like numerals and for simplicity are not described again in detail. In some embodiments, filter cartridges 212, 312 may be interchangeable with filter cartridges 112.

As shown in FIG. 5. Filter cartridge 212 has a plurality of secondary frames 226. Each secondary frame 226 extends longitudinally within the volume enclosed by filter cartridge 212 and defines a generally cylindrical shape. In the depicted embodiment, each frame 226 includes one or more longitudinal beams 226a and one or more hoops 226b. As depicted, hoops 226b extend helically. Alternatively, hoops 226b may be cylindrical rings. Beams 226a and hoops 226b may be attached to one another, for example, using suitable fasteners or by welding. In some embodiments, frame 226 may include various combinations of beams, hoops, or other support structures.

A secondary filter 228 is supported on each secondary frame 226. Specifically, each secondary filter 228 is wrapped around a respective secondary frame 226, defining a cylindrical filtering surface that circumscribes and encloses a respective flow passage 130. Secondary filter 228 may be attached to secondary frame 226, for example using suitable fasteners or by welding.

Secondary filter 228 may be formed of perforated sheet metal or mesh screen. In some embodiments, secondary filter 228 has a pore size smaller than that of primary filter 124. For example, primary filter 124 may be perforated plate with 1/16" perforations, and secondary filter 228 may be a fine mesh screen, such as 80 mesh. Alternatively, secondary filter 228 may have the same pore size as primary filter 224.

Primary filter 124 and secondary filter 228 may perform two-stage filtering as described above with reference to filter cartridge 112 and therefore may provide a balance of filtering performance (e.g. low particulate passthrough), flow resistance (e.g. low pressure head loss) and resistance to tin bed clogging.

The total surface area of secondary filters 228 may be greater than that of secondary filter 128, within a cartridge of the same external dimensions.

Thus, the configuration of filter cartridge 212 may provide further space efficiency. For example, the total filtering surface area of primary filters 124 and secondary filters 228 may be increased, while still fitting within the periphery of a primary frame 120 of the same size.

Increased filtering area may provide increased filtering performance, e.g., lower pass through of debris; lower pressure head loss at a given fluid flow rate; and increased resistance to thin bed clogging, as strained particulates may be spread over a greater area.

In some applications, a secondary filter at least 10% of the surface area of the primary filter may provide preferred performance. In other applications, a secondary filter at least 20% of the surface area of the primary filter may provide preferred performance. In other applications, a secondary filter at of between 25% to 30% of the surface area of the primary filter may provide preferred performance. In other applications, secondary filters having surface area of at least 5% of the area of the primary filter, or having surface area greater than 40% of the area of the primary filter may be suitable.

As noted, filter cartridges may be subject to stringent strength specifications. For example, cartridges may need to withstand suction forces, impacts, and seismic events. Therefore, secondary frames 226 reinforce secondary filters 228. Beams 226a provide longitudinal strength. Hoops 226b provide radial strength. Moreover, beams 226a and hoops 226b reinforce one another.

Filtering cartridges 212 may further include one or more reinforcing plates 232 for further supporting secondary frames 226, secondary filters 228, and primary filter 124. Reinforcing plates 232 may be attached to primary frame 120, for example using suitable fasteners or by welding. Reinforcing plates 232 have a plurality of openings through which secondary frames 226 and secondary filters 228 are received. Secondary frames 226 and secondary filters 228 may optionally be attached to reinforcing plates 232, e.g. by welding.

Secondary frames and secondary filters may be configured in other three-dimensional shapes, such as prisms with polygonal cross-section. For example, FIG. 6 depicts a filter cartridge 312 with internal secondary frames 326 and secondary filters 328 defining a diamond-shaped cross-section.

Each of secondary frames 326 has one or more longitudinal beams 326a and one or more transverse beams 326b. Longitudinal beams 326a and transverse beams 326b may be attached to one another using suitable fasteners or by welding.

A secondary filter 328 is wrapped around each secondary frame 326, circumscribing and enclosing a respective flow passage 130. Secondary filters 328 may be formed of perforated plate or mesh screen. Each secondary filter 328 may be a single unitary piece, bent to define the desired cross-sectional shape. Alternatively, secondary filters 328 may be formed of multiple pieces.

In some embodiments, secondary filter 328 has a pore size smaller than that of primary filter 124. For example, primary filter 124 may be perforated plate with 1/16" perforations, and secondary filter 328 may be a fine mesh screen, such as 80 mesh. Alternatively, secondary filter 328 may have the same pore size as primary filter 224.

Primary filter 124 and secondary filter 328 may perform two-stage filtering as described above with reference to filter cartridge 112 and therefore may provide a balance of filtering performance (e.g. low debris passthrough), flow resistance (e.g. low pressure head loss) and resistance to tin bed clogging.

The total surface area of secondary filters 328 may be greater than that of secondary filter 128, within a cartridge of the same external dimensions. In some embodiments, the total surface area of secondary filters 328 may be at least 20% of the surface area of primary filters 124.

Thus, the configuration of filter cartridge 312 may provide further space efficiency. For example, the total filtering surface area of primary filters 124 and secondary filters 328 may be increased, while still fitting within the periphery of a primary frame 120 of the same size.

Secondary frames 326 reinforce secondary filters 328. Beams 326a provide longitudinal strength. Hoops 326b provide radial strength. Moreover, beams 326a and hoops 326b reinforce one another.

Filtering cartridges 312 may further include one or more reinforcing plates 332 for further supporting secondary frames 326 and secondary filters 328. Reinforcing plates 332 may be attached to primary frame 120, for example using suitable fasteners or by spot welding. Reinforcing plates 332 have a plurality of openings through which secondary frames 326 and secondary filters 328 are received. Secondary frames 326 and secondary filters 328 may optionally be attached to reinforcing plates 332, e.g. by welding.

Secondary frames and secondary filters having polygonal cross-sections, such as those depicted in FIG. 6, may be somewhat less expensive to fabricate and have a reduced weight in comparison to similarly sized cylindrical secondary frames and filters such as those depicted in FIG. 5. A secondary filter having polygonal cross-section may also require less supporting structure than a rounded shape (i.e. a cylindrical shape) because the sides of the polygon are flat and may be supported around the perimeter of each face of the polygon. In contrast, a filter having a cylindrically shaped cross-section may require intermediate supports, e.g. supports 226a, 226b shown in FIG. 6, to maintain the cylindrical shape when the filter is in use. However, it may be possible to achieve a greater secondary filter area using cylindrical secondary filters, e.g. a greater ratio of secondary filter area to primary filter area. Accordingly, in some applications, cylindrical secondary filters may be used to provide a large secondary filtering area, albeit at somewhat higher cost. In other applications, secondary filters having polygonal cross sections may be used for reduction of cost. In some applications, secondary filters of different shapes may be used in combination.

Figure 7:
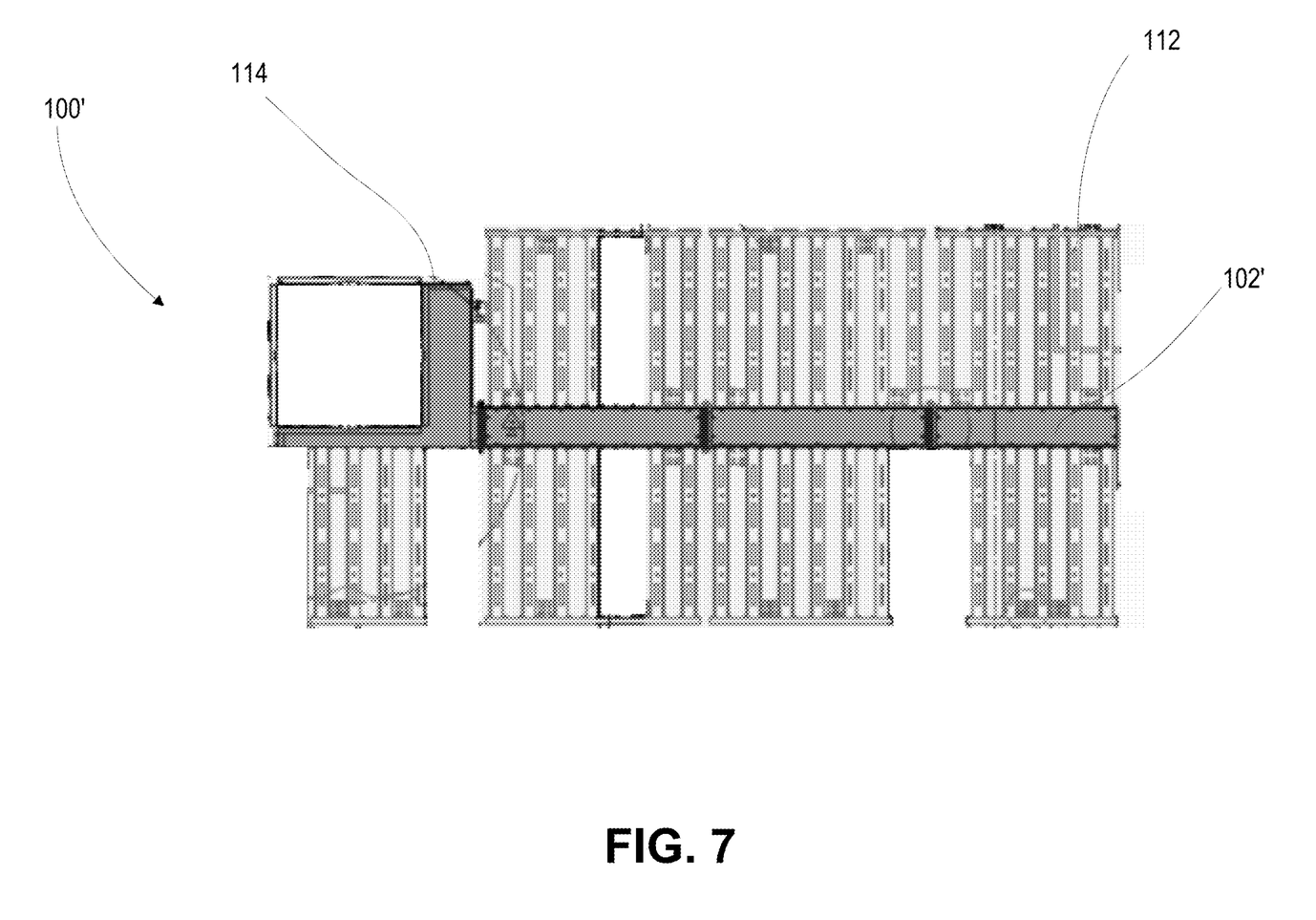
FIG. 7 is an isometric view of another fluid recirculation intake system, with filter cartridges mounted to an intake manifold.

As described above, filter cartridges 112, 212, 312 communicate with suction inlet 114 through a sump pit 102. However, in some embodiments, filter cartridges may be mounted to one or more fluid conduits such as a manifold and fluid may pass from the filter cartridges to suction inlet 114 through such fluid conduits. FIG. 7 depicts an example recirculation intake system 100' with filter cartridges 112 mounted to a manifold 102'.

The physical layout of sump pit 102 and filter assembly 110 described above and shown in the figures is an example only. Variations are possible and may be dictated by positions of other components in a particular facility.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

What is claimed is:

1. A filtering apparatus for a fluid intake of a nuclear power generation facility, comprising:
    a primary frame (120) defining a primary enclosed volume, a first inlet opening (221, 321) in fluid communication with said primary enclosed volume, and at least one outlet opening (123) extending through a sidewall (122) of said primary frame (120) for fluid communication with the fluid intake;
    a first primary filter (124) supported on said primary frame (120) and spanning said first inlet opening (221, 321);
    a second primary filter (124) supported on said primary frame (120) and spanning a second inlet opening, said second primary filter (124) being spaced from said first primary filter (124) defining a secondary enclosed volume, such that fluid passes into said secondary enclosed volume through said first and/or second primary filters (124);
    a plurality of secondary frames (226, 326) longitudinally extending within said secondary enclosed volume; and
    a plurality of secondary filters (228, 328) longitudinally extending within said secondary enclosed volume and being supported on said plurality of secondary frames (226, 326), each secondary filter (228, 328) defining an enclosed flow passage (130) in fluid communication with said at least one outlet opening (123), wherein fluid passes through said primary filters (124), through said secondary filters (228, 328) through said enclosed flow passages (130), and out of the filtering apparatus through said at least one outlet opening (123), wherein said plurality of secondary filters (228, 328) are spaced apart from said primary filters (124).

2. The filtering apparatus of claim 1, wherein said plurality of secondary filters (228) are cylindrical in shape.

3. The filtering apparatus of claim 2, wherein each secondary frame (226, 326) includes a plurality of longitudinal beams (226a, 326a) and a plurality of hoops (226b, 326b).

4. The filtering apparatus of claim 3, wherein said plurality of hoops (226b) extend helically.

5. The filtering apparatus of claim 3, wherein said plurality of beams (226a) and said plurality of hoops (226b) are attached to one another.

6. The filtering apparatus of claim 3, wherein said plurality of beams (226a) and said plurality of hoops (226b) are welded together.

7. The filtering apparatus of claim 1, wherein said first and second primary filters (124) are folded to define a plurality of corrugations or ridges.

8. The filtering apparatus of claim 1, wherein each secondary filter (228) is wrapped around a respective secondary frame (226), defining a cylindrical filtering surface that circumscribes and encloses a respective flow passage (130).

9. The filtering apparatus of claim 1, further comprising reinforcing plates (232) which are attached to said primary frame (120).

10. The filtering apparatus of claim 1, further comprising reinforcing plates (232) having a plurality of openings through which secondary frames (226) and secondary filters (228) are received.

11. The filtering apparatus of claim 1, wherein said plurality of secondary filters (228) comprise perforated sheet metal.

12. The filtering apparatus of claim 1, wherein said plurality of secondary filters (228) comprise mesh screen.

13. The filtering apparatus of claim 1, wherein each secondary filter (228) has a pore size smaller than that of said first and second primary filters (124).

14. The filtering apparatus of claim 1, wherein the total surface area of said plurality secondary filters (228) is at least 5% of the total surface area of said first and second primary filters (124).

15. The filtering apparatus of claim 1, wherein the total surface area of said plurality of secondary filters (228) is at least 10% of the total surface area of said first and second primary filters (124).

16. The filtering apparatus of claim 1, wherein the total surface area of said plurality of secondary filters (228) is at least 20% of the total surface area of said first and second primary filters (124).

17. The filtering apparatus of claim 1, wherein the total surface area of said plurality of secondary (228) filters is at least 40% of the total surface area of said first and second primary filters (124).

18. The filtering apparatus of claim 1, wherein each of said secondary filters defines a filtering surface having a plurality of polygonal sides.

* * * * *